United States Patent
Delaire et al.

(10) Patent No.: US 6,867,512 B2
(45) Date of Patent: Mar. 15, 2005

(54) ACTUATOR HAVING A PERMANENT MAGNET

(75) Inventors: Gilles Delaire, Chatham (CA); Frederic Gagnon, Chatham (CA)

(73) Assignee: Siemens VDO Automotive Inc., Chatham (CA)

( * ) Notice: Subject to any disclaimer, the term of this patent is extended or adjusted under 35 U.S.C. 154(b) by 45 days.

(21) Appl. No.: 10/607,404

(22) Filed: Jun. 26, 2003

(65) Prior Publication Data

US 2004/0263002 A1 Dec. 30, 2004

Related U.S. Application Data

(62) Division of application No. 10/253,198, filed on Sep. 24, 2002, now Pat. No. 6,787,946.
(60) Provisional application No. 60/373,382, filed on Apr. 12, 2002.

(51) Int. Cl.[7] .......................... H02K 41/00; H02K 15/16
(52) U.S. Cl. .............................. 310/14; 29/596; 29/606; 29/607; 310/12

(58) Field of Search ............................. 310/14, 13, 12; 335/221–225, 229, 281–282; 29/596–598, 606, 607; 251/129.1–129.15

(56) References Cited

U.S. PATENT DOCUMENTS

| 3,772,540 A | * | 11/1973 | Benson ........................ 310/14 |
| 5,734,209 A | * | 3/1998 | Hallidy ........................ 310/12 |
| 6,051,896 A | * | 4/2000 | Shibuya et al. ................ 310/12 |

* cited by examiner

*Primary Examiner*—Darren Schuberg
*Assistant Examiner*—Leda Pham
(74) *Attorney, Agent, or Firm*—Pasquale Musacchio

(57) ABSTRACT

A solenoid for use in a valve such as an exhaust gas recirculation valve for a motor vehicle. The solenoid includes a housing having a coil for generating a first magnetic field. An armature is slidably mounted in the housing. The solenoid further includes a permanent magnet having a second magnetic field, wherein the magnet is located adjacent the armature. In addition, a stator is affixed in the housing for cooperation with the armature and the magnet to form a third magnetic field.

6 Claims, 4 Drawing Sheets

ACTUATOR HAVING A PERMANENT MAGNET

CROSS REFERENCE TO RELATED APPLICATION AND PRIORITY CLAIM

This application is a division of Ser. No. 10/253,198 filed Sep. 24, 2002 now U.S. Pat. No. 6,787,946 entitled ACTUATOR HAVING A PERMANENT MAGNET.

This application claims the benefit of U.S. Provisional Application No. 60/373,382 filed on Apr. 12, 2002 in the name of Gilles Delaire and Frederic Gagnon and entitled USE OF A MAGNET IN A LINEAR SOLENOID ACTUATOR, which is incorporated by reference herein in its entirety.

FIELD OF THE INVENTION

This invention relates to evaporative emission control systems for internal combustion engines, and more particularly, to an actuator having a permanent magnet for increasing armature force and displacement.

BACKGROUND OF THE INVENTION

Many motor vehicles utilize actuators such as solenoids to operate several types of devices. This includes devices such as a fuel cell valve or an exhaust gas recirculation (EGR) valve used in an EGR system. In such systems, the EGR valve is controlled by a circuit in accordance with various engine operating conditions to regulate the amount of engine exhaust gas that is recirculated back into the engine for combustion. This serves to limit the combustion temperature and hence reduce the formation of oxides of nitrogen.

Solenoids typically utilize an electromagnet coil to generate a magnetic force which causes an armature to move along an axis. The armature may be part of a mechanism for operating a valve, such as an EGR valve. Referring to FIG. 1, an enlarged view of a first magnetic flux density 10 located near portions of a lower stator 12, upper stator 46, gap 36, first armature 14 and coil 16 of a conventional solenoid is shown. It is noted that the configuration shown is substantially symmetrical about an axis of the solenoid and that only one side of the axis is shown for purposes of clarity. The lower stator 12 has a frusto-conical shape having a predetermined geometry and is separated from the upper stator 46 by a gap 36. The shape of the lower stator 12 along with the size of the gap 36 and other parameters are selected so as to optimize a flux path that forms a part of a magnetic circuit. This provides a desired solenoid characteristic in that the armature force is substantially constant with respect to armature displacement. Referring to FIG. 1, the magnetic flux density vectors are oriented in a substantially clockwise configuration in a lower portion 18 of the first armature 14 adjacent to the lower stator 12. In addition, the magnetic flux density vectors are relatively dispersed along an edge 20 of the lower portion 18. In this configuration, the magnetic flux density in an upper section 22 of the lower stator 12 ranges from approximately 1597 to 2195 kiloGauss (kGauss).

It is desirable that solenoids used in motor vehicles provide increased armature force and increased travel so as to improve controllability and increase flow. However, this would require larger solenoids and the amount of space available in current vehicle engine compartments is limited.

SUMMARY OF THE INVENTION

A solenoid which includes a housing having a coil for generating a first magnetic field. An armature is slidably mounted in the housing. The solenoid further includes a permanent magnet having a second magnetic field, wherein the magnet is located adjacent the armature. In addition, a stator is affixed in the housing for cooperation with the armature and the magnet to form a third magnetic field.

The features of the invention believed to be novel are set forth with particularity in the appended claims. The invention itself, however, both as to organization and method of operation, may be best understood by reference to the following description taken in conjunction with accompanying drawings.

DETAILED DESCRIPTION OF THE INVENTION

Figure 1:
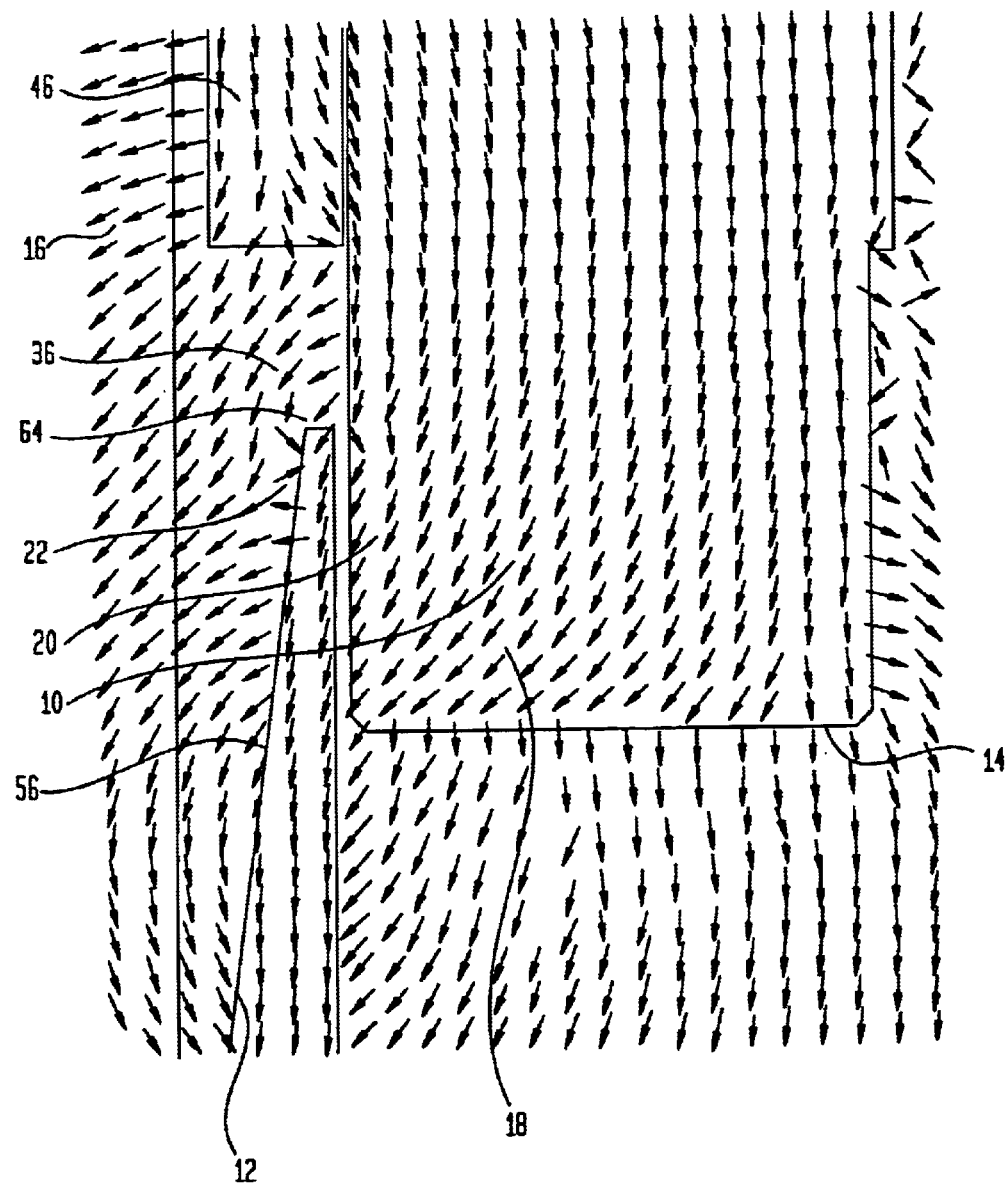
FIG. 1 is a view of a first magnetic flux density in a conventional solenoid.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of FIGS. 1–4.

Figure 2:
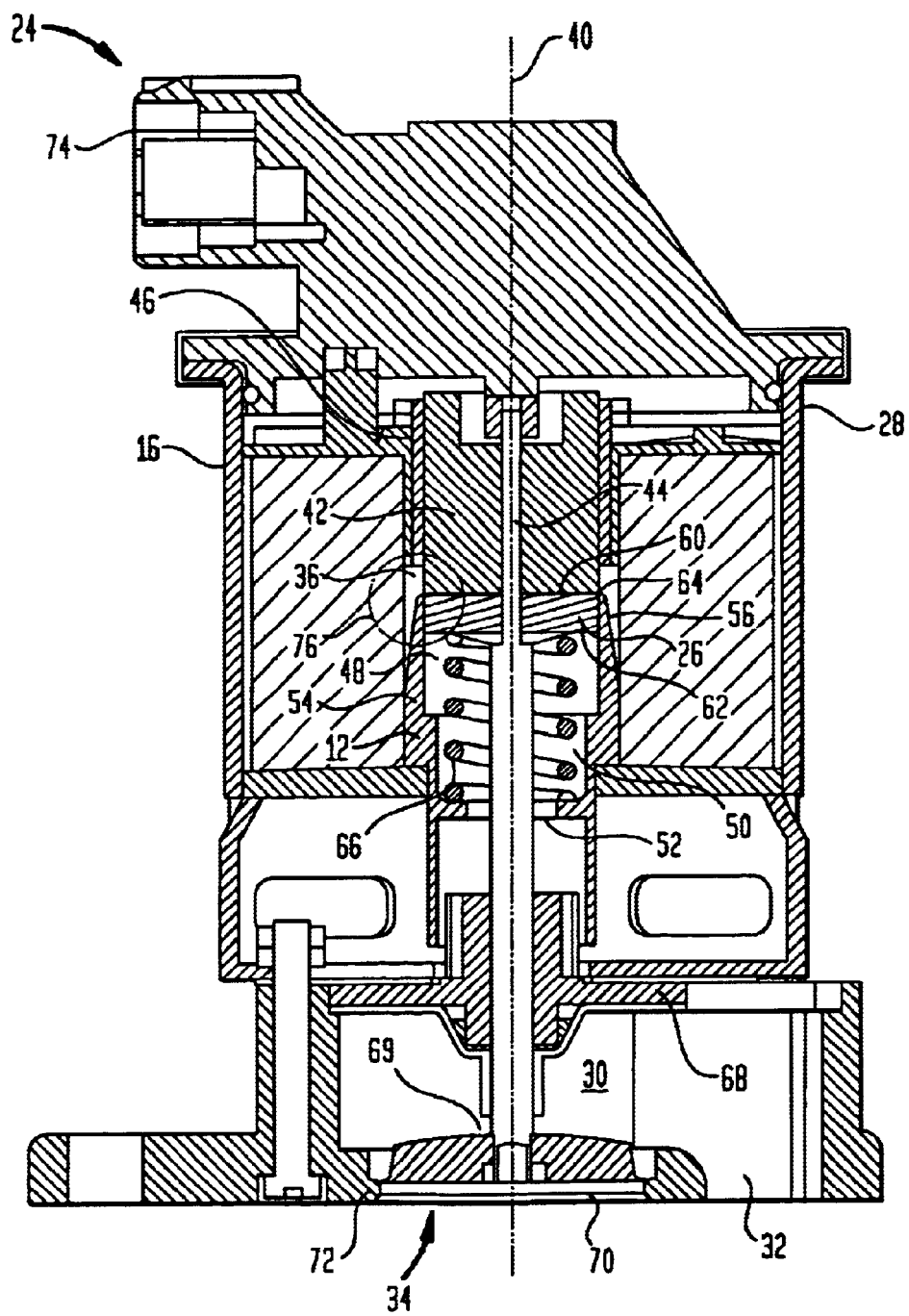
FIG. 2 is a cross sectional view of a solenoid having a permanent magnet in accordance with the present invention.

Referring to FIG. 2, a cross sectional view of an actuator such as a solenoid 24 including a permanent magnet 26 in accordance with the present invention is shown. The solenoid 24 includes a housing 28 having an internal passageway 30 which is in fluid communication with an outlet port 32 and an inlet port 34. When the solenoid 24 is used in an exhaust gas recirculation (EGR) valve, the inlet port 34 is in fluid communication with engine exhaust gas and the outlet port 32 is in fluid communication with an engine induction system of an internal combustion engine. It is noted that the current invention may be used in other types of devices that use actuators, such as fuel cell valves.

The coil 16 is symmetrically disposed about a first axis 40 of the housing 28. The housing 28 includes a second armature 42 that is affixed to a valve stem 44. A portion of the second armature 42 is located within an upper stator 46 that is affixed to the housing. The upper stator 46 is separated from the lower stator 12 by the gap 36. The lower stator 12 is symmetric about the first axis 40 and is located adjacent the second armature 42. The lower stator 12 includes a first bore 48 and a second bore 50 of reduced size that is bounded by an end wall 52. The lower stator 12 further includes an axially extending side wall 54. A tapered wall 56 extends from the side wall 54 toward the first axis 40 and terminates at a tip surface 64 adjacent the magnet 26 to form a substantially frusto-conical configuration.

The permanent magnet 26 includes top 60 and bottom 62 surfaces. The magnet 26 is substituted for a portion of the first armature 14 in a conventional solenoid such that the overall size of the second armature 42 and magnet 26 is substantially equivalent to that of the first armature 14, resulting in a solenoid of substantially the same size. The magnet 26 is positioned in the first bore 48 such that the top surface 60 is adjacent the second armature 42 and substantially colinear with the tip surface 64. As will be described, the magnet 26 is located so that its magnetic field is added to the first magnetic field 10 generated by coil 16. This results in a solenoid having a substantially higher armature force within substantially the same solenoid volume.

The housing 28 further includes a spring 66 located in the first 48 and second 50 bores between the bottom surface 62 of the magnet 26 and the end wall 52. A bearing member 68 is affixed within the housing between the end wall 52 and the passageway 30. The stem 44 extends through the magnet 26, spring 66, end wall 52, bearing member 68 and into the passageway 30. A bottom end 69 of the stem 44 includes a valve head 70 shaped for cooperation with a valve seat 72 formed in the inlet port 34.

The bearing 68 enables movement of stem 44 along the first axis 40. This enables movement of the valve head 70 between open and closed positions. In the open position, the valve head 70 is spaced downward from the seat 72 to enable fluid communication between the inlet 34 and outlet 32 ports. In the closed position, the valve head 70 contacts the seat 72 to thus close the inlet port 34 as shown in FIG. 2. The spring 66 is biased against the bottom surface 62 of the magnet 26 to urge the magnet 26 and thus the valve head 70 to the closed position. Upon energization of the coil 16, a magnetic field is generated which is sufficient to overcome spring bias to cause downward movement of the second armature 42 and place the valve head 70 in the open position. The housing 28 also includes a connector 74 which serves to transmit electrical power from a power source to the coil 16 for forming the first magnetic field 10.

Figure 3:
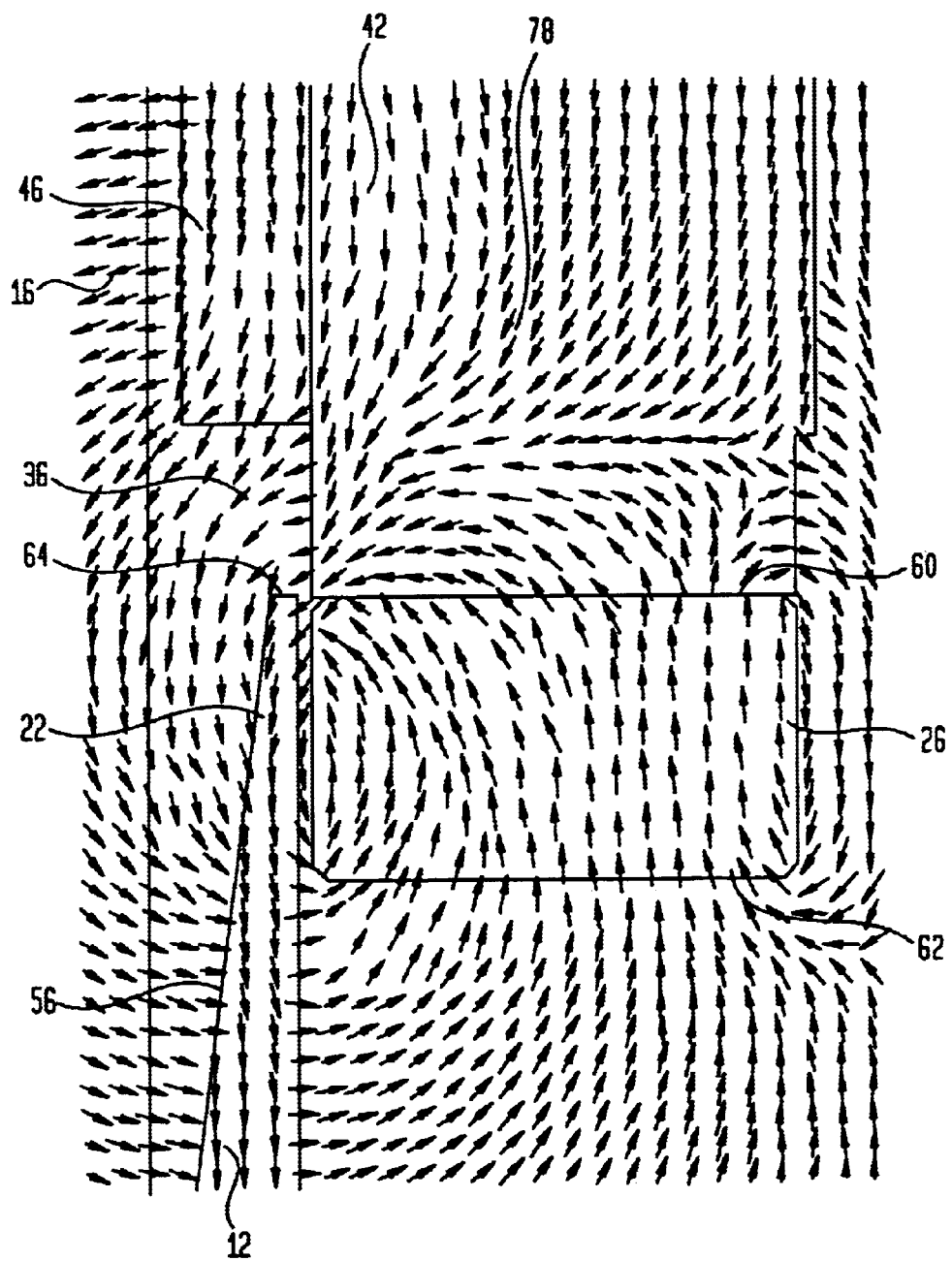
FIG. 3 is a view of a second magnetic flux density in accordance with the present invention.

Referring to FIG. 3, an enlarged view of balloon section 76 of FIG. 2 is shown. FIG. 3 depicts a second magnetic flux density 78 located near portions of the lower stator 12, upper stator 46, magnet 26, second armature 42 and coil 16 in accordance with the present invention. The top surface 60 of the magnet 26 is located adjacent the second armature 42 so that its magnetic field is added to the first magnetic field 10 generated by the coil 16 to thus form the second magnetic flux density 78. The flux density vectors are oriented in a substantially counterclockwise configuration in the magnet 26, second armature 42, and gap 36. Further, the magnetic flux density vectors are concentrated at the tip surface 64. This serves to increase the force on the second armature 42. In addition, the magnetic flux density in the upper section 22 of the lower stator 12 is approximately 2524 kGauss, resulting in an increased flux density in the upper section 22 over that of conventional solenoids. It is noted that the shape of the lower stator 12, size of the gap 36 and other associated parameters may be optimized for use with the magnet 26.

Figure 4:
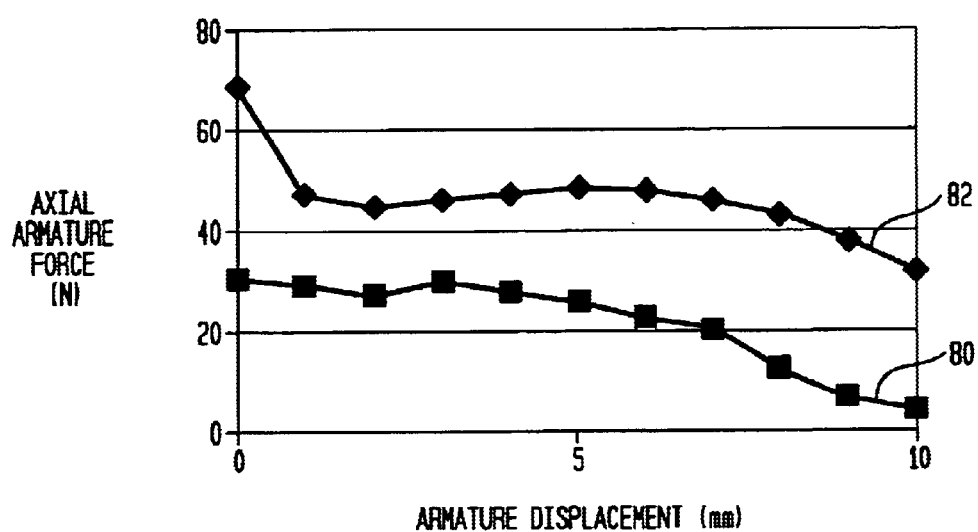
FIG. 4 depicts first and second curves which show force and displacement properties for a conventional solenoid and for a solenoid of the present invention, respectively.

Referring to FIG. 4, first 80 and second 82 curves depicting force and displacement properties for a conventional solenoid and for the solenoid 24, respectively, are shown. In particular, it can be seen that armature force for a given armature displacement is substantially increased for the solenoid 24 relative to that of a conventional solenoid. This results in substantially improved valve performance.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method for operating a valve, comprising the steps of:
   providing a housing having first and second ports;
   generating a first magnetic field by using a coil;
   providing an armature having a valve head for closing and opening said first port;
   providing a permanent magnet for generating a second magnetic field, wherein said magnet is located adjacent said armature; and
   providing a stator for cooperation with said armature and said magnet to form a third magnetic field for moving said armature and thus said valve head to open and close said first port.

2. The method according to claim 1, wherein said stator has a frusto-conical configuration.

3. The method according to claim 1, wherein a magnetic flux density of said third magnetic field has a counterclockwise orientation.

4. The method according to claim 2, wherein a magnetic flux density of said third magnetic field is concentrated on a tip of said stator.

5. The method according to claim 2, wherein a magnetic flux density in an upper portion of said stator is approximately 2524 kiloGauss.

6. The method according to claim 2, wherein said magnet is colinear with a tip of said stator.

* * * * *